US012412524B2

(12) United States Patent
Wan

(10) Patent No.: US 12,412,524 B2
(45) Date of Patent: Sep. 9, 2025

(54) PIXEL DRIVING CIRCUIT, PIXEL DRIVING METHOD, AND DISPLAY PANEL

(71) Applicant: Shenzhen China Star Optoelectronics Semiconductor Display Technology Co., Ltd., Guangdong (CN)

(72) Inventor: Peng Wan, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/772,194

(22) PCT Filed: Apr. 15, 2022

(86) PCT No.: PCT/CN2022/086966

§ 371 (c)(1),
(2) Date: Apr. 27, 2022

(87) PCT Pub. No.: WO2023/184591

PCT Pub. Date: Oct. 5, 2023

(65) Prior Publication Data

US 2024/0304140 A1 Sep. 12, 2024

(30) Foreign Application Priority Data

Mar. 31, 2022 (CN) ......................... 202210336370.7

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01); *G09G 2320/0242* (2013.01)

(58) Field of Classification Search
CPC ......... G09G 3/3233; G09G 2300/0842; G09G 2320/0233; G09G 2320/0242
See application file for complete search history.

(56) References Cited

U.S. PATENT DOCUMENTS

2004/0004443 A1* 1/2004 Park ..................... G09G 3/3241
315/169.1
2004/0227709 A1* 11/2004 Lih ...................... G09G 3/3233
345/82
(Continued)

FOREIGN PATENT DOCUMENTS

CN 1679074 10/2005
CN 105609047 5/2016
(Continued)

OTHER PUBLICATIONS

International Search Report and the Written Opinion Dated Dec. 12, 2022 From the International Searching Authority Re. Application No. PCT/CN2022/086966 and Its Translation Into English. (18 Pages).

(Continued)

*Primary Examiner* — David Tung

(57) ABSTRACT

The present disclosure provides a pixel driving circuit, a pixel driving method, and a display panel. The pixel driving circuit includes a light emitting element electrically connected between a first node and a second node; a driving transistor connected in series between the second node and the light emitting element; and an auxiliary transistor connected in series between a third node and the light emitting element, where the auxiliary transistor is configured to generate an auxiliary current to jointly drive the light emitting element with a driving current generated by the driving transistor.

12 Claims, 2 Drawing Sheets

(56) References Cited

U.S. PATENT DOCUMENTS

| | | | | |
|---|---|---|---|---|
| 2006/0113919 | A1* | 6/2006 | Childs | G09G 3/3233 315/169.3 |
| 2007/0164938 | A1* | 7/2007 | Shin | G09G 3/3233 345/76 |
| 2009/0201235 | A1 | 8/2009 | Kanc | |
| 2010/0302285 | A1* | 12/2010 | Yamanaka | G09G 3/3233 345/76 |
| 2015/0084538 | A1 | 3/2015 | Yang et al. | |

FOREIGN PATENT DOCUMENTS

| | | |
|---|---|---|
| CN | 105845083 | 8/2016 |
| CN | 108039146 | 5/2018 |
| CN | 110473494 | 11/2019 |
| CN | 110570809 | 12/2019 |
| CN | 110808010 | 2/2020 |
| JP | 2004-317677 | 11/2004 |
| JP | 2009-251545 | 10/2009 |

OTHER PUBLICATIONS

Notification of Office Action Dated Dec. 2, 2022 From the State Intellectual Property Office of the People's Republic of China Re. Application No. 202210336370.7 and Its Translation Into English. (8 Pages).

Notification of Office Action and Search Report Dated May 11, 2023 From the State Intellectual Property Office of the People's Republic of China Re. Application No. 202210336370.7 and Its Translation Into English. (16 Pages).

* cited by examiner

PIXEL DRIVING CIRCUIT, PIXEL DRIVING METHOD, AND DISPLAY PANEL

RELATED APPLICATIONS

This application is a National Phase of PCT Patent Application No. PCT/CN2022/086966 having International filing date of Apr. 15, 2022, which claims the benefit of priority of Chinese Patent Application No. 202210336370.7 filed on Mar. 31, 2022. The contents of the above applications are all incorporated by reference as if fully set forth herein in their entirety.

The present disclosure relates to a display technology field, and in particular, to manufacturing a display device, and specifically to a pixel driving circuit, a pixel driving method, and a display panel.

FIELD AND BACKGROUND OF THE INVENTION

Different from a liquid crystal display panel, OLED (Organic Light Emitting Diode) and LED (Light Emitting Diode) are used as self light-emitting devices for displaying a picture, and have advantages such as a light weight, a thin thickness.

The OLED and the LED have different light emitting brightness under different currents to correspond to different gray scales. However, there is a difference among the brightness presented by sub-pixels having different colors in the OLED or the LED under respective voltages corresponding to the same gray scale, which causes a color shift phenomenon in a color presented by a pixel consisted of the sub-pixels, resulting in a distortion of a display picture and reducing the quality of the display picture on a display panel.

As a result, there is a distortion phenomenon in the display picture of the display panel made by an existing OLED and LED, which needs to be improved.

Embodiments of the present disclosure provide a pixel driving circuit, a pixel driving method, and a display panel, so as to resolve a technical problem of a distortion of the display picture of the display panel made by the existing OLED and LED due to a brightness difference of light emitting elements having different light emitting colors in the display panel under the same gray scale.

The present disclosure provides a pixel driving circuit, including:

a light emitting element electrically connected between a first node and a second node;

a driving transistor connected in series between the second node and the light emitting element, wherein the driving transistor is configured to generate a driving current; and an auxiliary transistor connected in series between a third node and the light emitting element, wherein the auxiliary transistor is configured to generate an auxiliary current to jointly drive the light emitting element with the driving current.

In an embodiment, the pixel driving circuit further includes:

a switching transistor, wherein a gate of the driving transistor and a gate of the auxiliary transistor are both connected to a source or a drain of the switching transistor.

In an embodiment, an absolute value of a difference between a channel width of the auxiliary transistor and a channel width of the driving transistor is less than or equal to 10 microns.

In an embodiment, the channel width of the auxiliary transistor is less than or equal to 10 microns.

In an embodiment, the third node is loaded with an auxiliary voltage, the auxiliary voltage is less than a voltage at a connection point between the auxiliary transistor and the light emitting element, and the channel width of the auxiliary transistor is less than or equal to 10 microns.

In an embodiment, the light emitting element is an organic light emitting diode or an inorganic light emitting diode.

In an embodiment, the pixel driving circuit further includes:

a storage capacitor electrically connected between a gate of the driving transistor and one terminal of the light emitting element electrically connected to the driving transistor; and a switching transistor connected in series between the gate of the driving transistor and a data line, wherein the gate of the switching transistor is electrically connected to a gate line.

An embodiment of the present disclosure provides a pixel driving circuit, including:

a light emitting element electrically connected between a first node and a second node;

a driving transistor connected in series between the second node and the light emitting element, wherein the driving transistor is configured to generate a driving current; and an auxiliary transistor connected in series between a third node and the light emitting element, wherein the auxiliary transistor is configured to generate an auxiliary current to jointly drive the light emitting element with the driving current.

In an embodiment, a gate of the driving transistor is electrically connected to a gate of the auxiliary transistor.

In an embodiment, the pixel driving circuit further includes:

a switching transistor, wherein a gate of the driving transistor and a gate of the auxiliary transistor are both connected to a source or a drain of the switching transistor.

In an embodiment, the third node is loaded with an auxiliary voltage, and the auxiliary voltage is greater than a voltage at a connection point between the auxiliary transistor and the light emitting element.

In an embodiment, an absolute value of a difference between a channel width of the auxiliary transistor and a channel width of the driving transistor is less than or equal to 10 microns.

In an embodiment, the channel width of the auxiliary transistor is less than or equal to 10 microns.

In an embodiment, the third node is loaded with an auxiliary voltage, the auxiliary voltage is less than a voltage at a connection point between the auxiliary transistor and the light emitting element, and a channel width of the auxiliary transistor is less than or equal to 10 microns.

In an embodiment, the light emitting element is an organic light emitting diode or an inorganic light emitting diode.

In an embodiment, the pixel driving circuit further includes:

a storage capacitor electrically connected between a gate of the driving transistor and one terminal of the light emitting element electrically connected to the driving transistor; and a switching transistor connected in series between the gate of the driving transistor and a data line, wherein the gate of the switching transistor is electrically connected to a gate line.

An embodiment of the present disclosure further provides a pixel driving method for driving the pixel driving circuit of any one of the foregoing, including:

controlling the driving transistor to be turned on to generate a driving current to drive the light emitting element to emit light; and determining a voltage at the third node based on a difference between an actual gray scale and an expected gray scale of the light emitting element, to control the auxiliary transistor to be turned on to generate the auxiliary current.

In an embodiment, the gate of the driving transistor is electrically connected to the gate of the auxiliary transistor.

In an embodiment, the third node is loaded with an auxiliary voltage, and the auxiliary voltage is greater than a voltage at a connection point between the auxiliary transistor and the light emitting element.

In an embodiment, the third node is loaded with an auxiliary voltage, the auxiliary voltage is less than a voltage at a connection point between the auxiliary transistor and the light emitting element, and the channel width of the auxiliary transistor is less than or equal to 10 microns.

The present disclosure provides a pixel driving circuit, a pixel driving method, and a display panel. The pixel driving circuit includes the light emitting element electrically connected between the first node and the second node; the driving transistor connected in series between the second node and the light emitting element, wherein the driving transistor is configured to generate the driving current; and an auxiliary transistor connected in series between the third node and the light emitting element, wherein the auxiliary transistor is configured to generate the auxiliary current to jointly drive the light emitting element with the driving current. In the present disclosure, the auxiliary transistor is newly added to generate the auxiliary current, so that a magnitude of the current flowing through the light emitting element is adjusted on a basis of the driving current, so as to compensate for light emitting brightness of the light emitting element. As a result, a brightness difference of the light emitting elements having different light emitting colors at the same gray scale is reduced, thereby improving the color shift phenomenon of the pixel consisted of a plurality of light emitting elements having different light emitting colors.

BRIEF DESCRIPTION OF THE SEVERAL VIEWS OF THE DRAWINGS

The present disclosure is further illustrated below by referring to the accompanying drawings. It should be noted that the accompanying drawings in the following description are merely intended to explain some embodiments of the present disclosure. A person skilled in the art may still obtain other drawings from these accompanying drawings without creative efforts.

The present disclosure is further illustrated below by referring to the accompanying drawings. It should be noted that the accompanying drawings in the following description are merely intended to explain some embodiments of the present disclosure. A person skilled in the art may still obtain other drawings from these accompanying drawings without creative efforts.

DESCRIPTION OF SPECIFIC EMBODIMENTS OF THE INVENTION

Technical solutions in embodiments of the present disclosure will be clearly and completely described below in conjunction with drawings in the embodiments of the present disclosure. Obviously, the described embodiments are only a part of embodiments of the present disclosure, rather than all possible embodiments. Based on the embodiments in the present disclosure, all other embodiments obtained by those skilled in the art without creative work fall within the protection scope of the present disclosure.

The terms “first” and “second” in the present disclosure are used to distinguish different objects, and are not used to describe a specific order. In addition, the terms “include” and “have” and any variations thereto are intended to cover non-exclusive inclusions. For example, a process, a method, a system, a product, or a device that includes a series of steps or modules is not limited to the listed steps or modules, but optionally further includes the unlisted steps or modules, or optionally further includes another step or module inherent to the process, the method, the product, or the device.

“Embodiments” referred to in this specification means that specific features, structures, or characteristics described in connection with the embodiments may be included in at least one embodiment of the present disclosure. The phrase “embodiments” appearing at all locations in the specification does not necessarily refer to a same embodiment, or is an independent or alternative embodiment that is mutually exclusive from another embodiment. It is explicitly and implicitly understood by a person skilled in the art that the embodiments described in this specification may be combined with other embodiments.

An embodiment of the present disclosure provides a pixel driving circuit. The pixel driving circuit includes, but not limited to, the following embodiments and a combination of the following embodiments.

Figure 1:
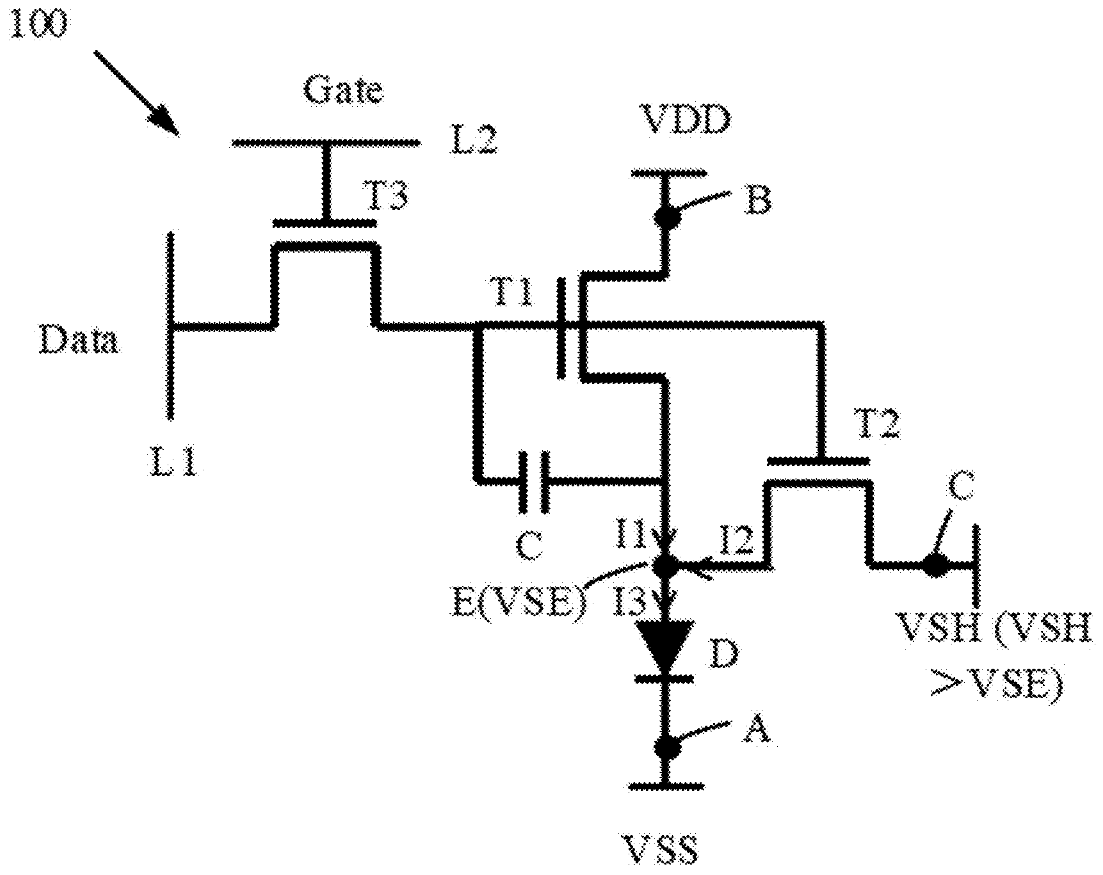
FIG. 1 is a schematic current diagram of a pixel driving circuit according to an embodiment of the present disclosure.
Figure 2:
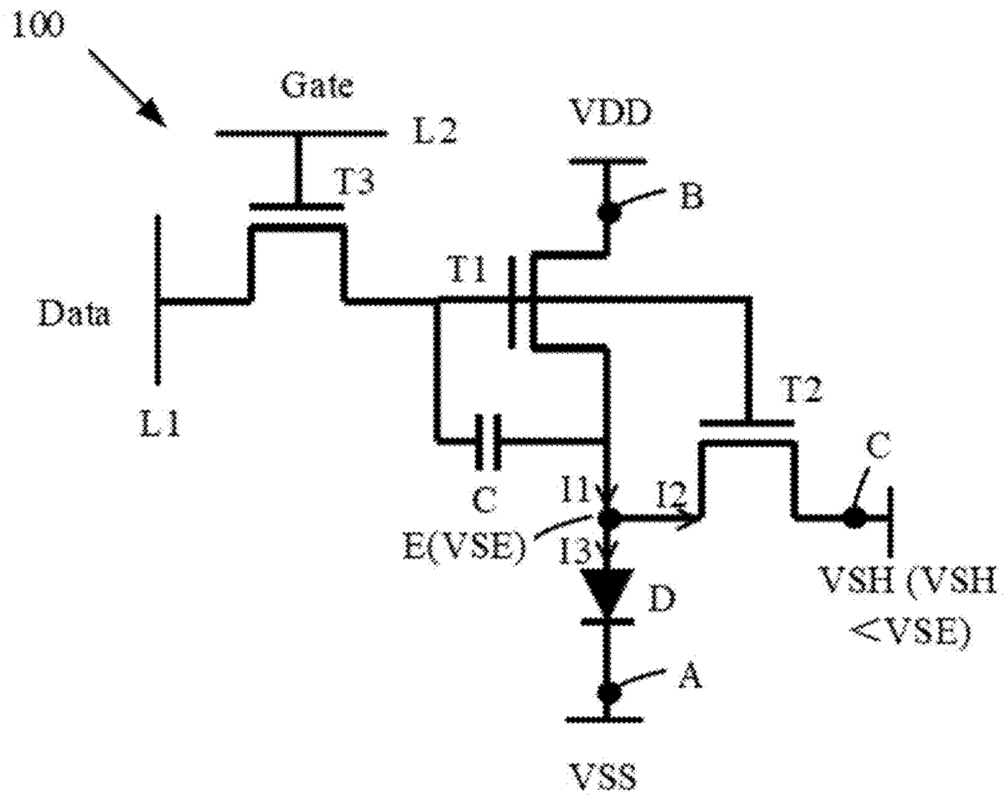
FIG. 2 is another schematic current diagram of a pixel driving circuit according to an embodiment of the present disclosure.

In an embodiment, as shown in FIG. 1 and FIG. 2, the pixel driving circuit 100 includes a light emitting element D electrically connected between a first node A and a second node B; a driving transistor T1 connected in series between the second node B and the light emitting element D, where the driving transistor T1 is configured to generate a driving current I1; and an auxiliary transistor T2 connected in series between a third node C and the light emitting element D, where the auxiliary transistor T2 is configured to generate an auxiliary current I2 to jointly drive the light emitting element D with the driving current I1.

The first node A may be loaded with a first signal VSS, the second node B may be loaded with a second signal VDD, the first signal VSS and the second signal VDD may be constant voltage values, and the voltage value of the first signal VSS may be less than that of the second signal VDD. For example, the voltage value of the first signal VSS may be 0 volt, that is, the first node A may be grounded. Specifically, when the driving transistor T1 is turned on, the driving current I1 flowing toward the light emitting element D may be generated under the first signal VSS and the second signal VDD. A value of the driving current I1 is also related to a voltage value loaded into the gate of the driving transistor T1, which is determined according to the voltage value corresponding to the expected gray scale of the light emitting element D. That is, it may be considered that the voltage value corresponding to the expected gray scale of the light emitting element D determines the value of the driving current I1 flowing toward the light emitting element D, thereby determining the light emitting brightness of the light emitting element D.

It should be noted that, for a plurality of light emitting elements D having different colors, there is a brightness difference presented among the light emitting elements D under the driving current I1 generated by a voltage value corresponding to the same expected gray scale. For example, the brightness presented by a green light emitting element D is higher when the expected gray scale is higher, and the brightness presented by the green light emitting element D is lower when the expected gray scale is lower. Consequently, a color presented by a pixel constructed by the plurality of light emitting elements D under the voltage value corresponding to the expected gray scale is offset to a color of one of the light emitting elements D, resulting in distortion of the display picture and reducing the quality of the display picture on the display panel.

As shown in FIG. 1 and FIG. 2, in this embodiment, a third signal VSH may be loaded into the third node C by disposing an auxiliary transistor T2 connected in series between the third node C and the light emitting element D, and the third signal VSH may also be a constant voltage value. Herein, a voltage value of the third signal VSH and a moment at which the third signal VSH is loaded into the third node C are not limited, as long as the auxiliary current I2 is generated by driving the auxiliary transistor T2. That is, the auxiliary current I2 needs to be generated during a process of generating the driving current I1 to simultaneously drive the light emitting element D. Whether a gate of the auxiliary transistor T2 and a gate of the driving transistor T1 are electrically connected is not limited in this embodiment. It may be understood that the auxiliary current I2 generated by a newly added auxiliary transistor T2 in this embodiment may be increased or decreased by a value of a current flowing into the light emitting element D on a basis of the driving current I1, so as to adjust the magnitude of the current I3 flowing through the light emitting element D to compensate for the light emitting brightness of the light emitting element D. As a result, the brightness difference of the light emitting elements D having the different light emitting colors at the same gray scale is reduced, thereby improving the color shift phenomenon of a pixel consisted of the plurality of light emitting elements D having the different light emitting colors.

In an embodiment, as shown in FIG. 1 and FIG. 2, the light emitting element D is an organic light emitting diode or an inorganic light emitting diode. Both the organic light emitting diode and the inorganic light emitting diode are self light emitting devices, and are current-controlled display devices. That is, both the light emitting brightness of the organic light emitting diode and the light emitting brightness of the inorganic light emitting diode are controlled by the magnitude of the current. Further, the inorganic light emitting diode may be a sub-millimeter inorganic light emitting diode or a micro inorganic light emitting diode. Specifically, the organic light emitting diode and the inorganic light emitting diode may be applied to a sub-pixel in the display panel, and the inorganic light emitting diode may be further applied to a back light source.

In an embodiment, as shown in FIG. 1 and FIG. 2, a gate of the driving transistor T1 is electrically connected to a gate of the auxiliary transistor T2. With reference to the foregoing, since the gate of the driving transistor T1 is electrically connected to that of the auxiliary transistor T2, and the auxiliary transistor T2 is connected in series between the third node C and the light emitting element D, the magnitude of the auxiliary current I2 is related to the voltage value loaded into the gate of the auxiliary transistor T2 (that is, the voltage value of the gate of the driving transistor T1) and the voltage value of the third signal VSH, that is, the voltage value loaded into the gate of the auxiliary transistor T2 is determined according to the voltage value corresponding to the expected gray scale of the light emitting element D and the voltage value of the third signal VSH.

It may be understood that, in this embodiment, since the gate of the driving transistor T1 is electrically connected to the gate of the auxiliary transistor T2, the same voltage value may be loaded into the gate of the driving transistor T1 and the gate of the auxiliary transistor T2 at the same time. Further, when material characteristics of the driving transistor T1 and the auxiliary transistor T2 are consistent, for example, a conduction voltage drop of the driving transistor T1 is not considered, the driving transistor T1 and the auxiliary transistor T2 may be simultaneously turned on to generate a driving current I1 and an auxiliary current I2 at the same time, so as to adjust a current flowing through the light emitting element D and improve real-time performance of adjusting the brightness of the light emitting element D.

In an embodiment, as shown in FIG. 1, the auxiliary voltage (i.e. the third signal VSH) is loaded into the third node, which is greater than a voltage VSE of one terminal E of the auxiliary transistor T2 electrically connected to the light emitting element D, where the voltage VSE is greater than the first signal VSS. It may be understood that, when the auxiliary transistor T2 is turned on, since the auxiliary voltage (that is, the third signal VSH) is greater than the voltage VSE of one terminal E of the auxiliary transistor T2 electrically connected to the light emitting element D, that is, there is a voltage difference between a source and a drain of the auxiliary transistor T2, the auxiliary current I2 is flowed from the terminal of the auxiliary transistor T2 electrically connected to the third node C to another terminal E of the auxiliary transistor T2 electrically connected to the light emitting element D, that is, the auxiliary current I2 is flowed into the light emitting element D. That is, on a basis of the driving current I1, the auxiliary current I2 is flowed into the light emitting element D as well, so that the current I3 flowing through the light emitting element D is increased. When a voltage value of the auxiliary voltage (that is, the third signal VSH) is set to be larger, the voltage value of the second signal VDD can be effectively reduced.

Specifically, as shown in FIG. 1, based on this embodiment, when the actual gray scale of the light emitting element D is lower compared with the expected gray scale, a voltage value of the auxiliary voltage (that is, the third signal VSH) may be increased, so as to increase the auxiliary current I2. As a result, the current I3 flowing through the light emitting element D is increased, so that the actual gray scale of the light emitting element D is increased to be close to the expected gray scale. Similarly, when the actual gray scale of the light emitting element D is higher than the expected gray scale, a voltage value of the auxiliary voltage (that is, the third signal VSH) may be reduced, so as to reduce the auxiliary current I2. As a result, the current I3 flowing through the light emitting element D is reduced, so that the actual gray scale of the light emitting element D is reduced to be close to the expected gray scale.

In an embodiment, as shown in FIG. 1, an absolute value of a difference between a channel width of the auxiliary transistor T2 and the channel width of the driving transistor T1 is less than or equal to 10 microns. Specifically, the channel width of the auxiliary transistor T2 and the channel width of the driving transistor T1 are not limited herein, as long as the absolute value of the difference between the channel width of the auxiliary transistor T2 and the channel width of the driving transistor T1 is less than or equal to 10 microns, that is, the channel width of the auxiliary transistor T2 and the channel width of the driving transistor T1 may be considered to be substantially consistent. It may be understood that, since the channel width of the auxiliary transistor T2 and the channel width of the driving transistor T1 are substantially consistent, it may be considered that a difference between the driving current I1 and the auxiliary current I2 is smaller. Further, a proper auxiliary voltage (that is, the third signal VSH) may be configured to set a proper auxiliary current I2. In a process of determining the auxiliary voltage (that is, the third signal VSH), an initial value of the voltage value of the auxiliary voltage (that is, the third signal VSH) may be set to be equal to the voltage value of the second signal VDD, and then the voltage value of the auxiliary voltage (that is, the third signal VSH) is increased or decreased, so as to obtain the auxiliary voltage (that is, the third signal VSH) corresponding to the gray scale value of the light emitting color.

In an embodiment, the channel width of the auxiliary transistor T2 is less than or equal to 10 microns, as shown in FIG. 1. Specifically, the channel width of the driving transistor T1 is much larger than 10 microns. For example, when the light emitting element D is a sub-millimeter inorganic light emitting diode, the channel width of the driving transistor T1 may be 10 microns to 60 microns. It may be understood that, since the channel width of the auxiliary transistor T2 is less than or equal to 10 microns, that is, the channel width of the driving transistor T1 may be considered to be much larger than the channel width of the auxiliary transistor T2. In combination with the above discussion, it may be considered that a difference between the driving current I1 and the auxiliary current I2 is larger, and the auxiliary current I2 is smaller with respect to the driving current I1. Further, the proper auxiliary voltage (i.e., the third signal VSH) may be configured to set the proper auxiliary current I2. The difference from "the channel width of the auxiliary transistor T2 and the channel width of the driving transistor T1 are substantially consistent" is that the auxiliary current I2 in this embodiment may achieve a fine adjustment of the current I3 flowing through the light emitting element D.

In an embodiment, as shown in FIG. 2, the auxiliary voltage (that is, a third signal VSH) is loaded into the third node C, which is less than a voltage VSE of one terminal E of the auxiliary transistor T2 electrically connected to the light emitting element D, and the channel width of the auxiliary transistor T2 is less than or equal to 10 microns, where the voltage VSE is greater than the first signal VSS and the third signal VSH. It may be understood that, when the auxiliary transistor T2 is turned on, since the auxiliary voltage (that is, the third signal VSH) is less than a voltage VSE of one terminal E of the auxiliary transistor T2 electrically connected to the light emitting element D, that is, there is a voltage difference between the source and the drain of the auxiliary transistor T2, the auxiliary current I2 is flowed from the terminal E of the auxiliary transistor T2 electrically connected to the light emitting element D to another terminal of the auxiliary transistor T2 electrically connected to the third node C, that is, the auxiliary current I2 shares a current of the driving current I1 flowing into the light emitting element D. That is, on a basis of the driving current I1, the auxiliary current I2 is flowed out, so that the current I3 flowing through the light emitting element D is reduced.

Further, since the auxiliary current I2 shares the current of the driving current I1 flowing into the light-emitting element D, the channel width of the auxiliary transistor T2 in this embodiment is less than or equal to 10 microns. In combination with the foregoing, that is, the difference between the driving current I1 and the auxiliary current I2 is larger, and the auxiliary current I2 is smaller than the driving current I1, which may effectively avoid an excessive auxiliary current I2 sharing more current of the driving current I1 flowing into the light-emitting element D and reduce the risk of insufficient light emitting brightness of the light-emitting element D due to too small current I3 flowing through the light-emitting element D.

Specifically, as shown in FIG. 2, based on this embodiment, when the actual gray scale of the light emitting element D is lower than the expected gray scale, a voltage value of the auxiliary voltage (that is, the third signal VSH) may be increased, so as to reduce the auxiliary current I2. As a result, the current I3 flowing through the light emitting element D is increased, so that the actual gray scale of the light emitting element D is increased to be close to the expected gray scale. Similarly, when the actual gray scale of the light emitting element D is higher than the expected gray scale, a voltage value of the auxiliary voltage (that is, the third signal VSH) may be reduced, so as to increase the auxiliary current I2. As a result, the current I3 flowing through the light emitting element D is reduced, so that the actual gray scale of the light emitting element D is reduced to be close to the expected gray scale.

In an embodiment, as shown in FIG. 1 and FIG. 2, the pixel driving circuit 100 further includes a storage capacitor C electrically connected between the gate of the driving transistor T1 and one terminal of the light emitting element D electrically connected to the driving transistor T1; and a switching transistor T3 connected in series between the gate of the driving transistor T1 and a data line L1, and the gate of the switching transistor T3 is electrically connected to a gate line L2.

A data signal, Data, can be loaded onto the data line L1, and a gate signal, Gate, can be loaded onto the gate line L2. The data signal Data may have a corresponding voltage value in each frame corresponding to different light emitting elements D, and the gate signal Gate has a high voltage at a specific moment. Specifically, as shown in FIG. 1 and FIG. 2, in a display phase, the gate signal Gate loaded on the gate line L2 is a high voltage, so that the switching transistor T3 may be controlled to be turned on, to transmit the data signal Data loaded onto the data line L1 to the gate of the driving transistor T1 and one terminal of the storage capacitor C electrically connected to the switching transistor T3 via the switching transistor T3. Then, the gate signal Gate on the gate line L2 becomes a low voltage, so that the switching transistor T3 is controlled to be turned off. Due to a storage function of the storage capacitor C, the voltage of the gate of the driving transistor T1 may continue to maintain a voltage value of the data signal Data transmitted via the switching transistor T3 at a previous moment, so that the driving transistor T1 is turned on. Further, In combination with the above discussion, an example that the gate of the driving transistor T1 is electrically connected to the gate of the auxiliary transistor T2 is taken herein, and the voltage of the gate of the auxiliary transistor T2 may also continue to maintain a voltage value of the data signal Data transmitted via the switching transistor T3 at the previous moment. That is, the driving transistor T1 and the auxiliary transistor T2 may be simultaneously turned on to generate the driving current I1 and the auxiliary current I2, so as to control a magnitude of the current I3 flowing into the light emitting element D to drive the light emitting element D to emit light.

It should be noted that, in this embodiment, an example that the pixel driving circuit 100 is based on the 2T1C architecture including the driving transistor T1, the switching transistor T3, and the storage capacitor C is taken. On this basis, the auxiliary transistor T2 connected in series between the third node C and the light emitting element D is newly added, and a proper auxiliary current I2 is formed by configuring a voltage value of the third signal VSH loaded into the third node C, so as to adjust a magnitude of the current I3 flowing through the light emitting element D. As a result, the brightness difference of the light emitting element D having different light emitting colors at the same gray scale is reduced, thereby improving the color shift phenomenon of the pixel consisted of the plurality of light emitting elements D having different light emitting colors. Certainly, an architecture other than the auxiliary transistor T2 in the pixel driving circuit 100 is not limited in the present disclosure, for example, may be but not limited to 3T1C, 6T1C, or 7T1C.

An embodiment of the present disclosure further provides a display panel including the pixel driving circuit according to any one of the foregoing.

Figure 3:
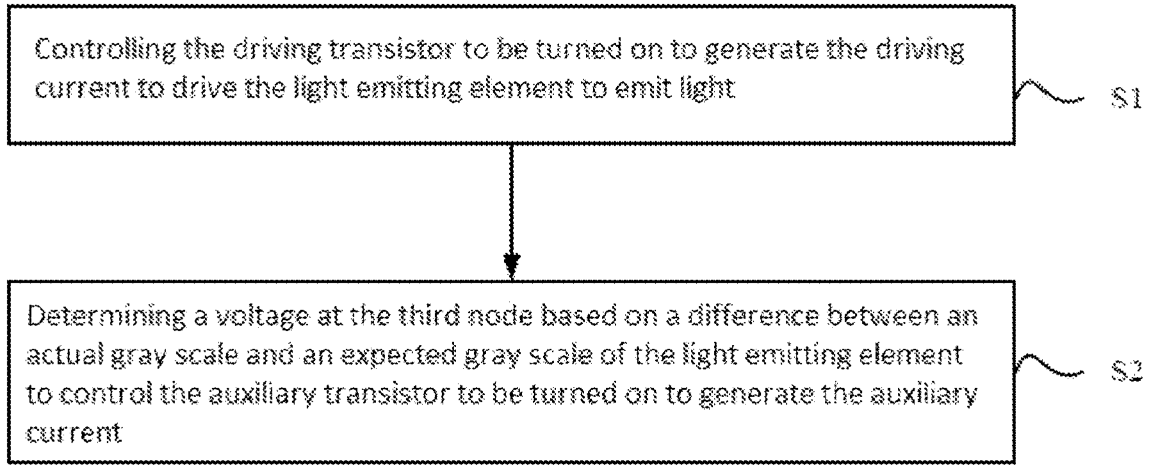
FIG. 3 is a flowchart of a pixel driving method according to an embodiment of the present disclosure.

An embodiment of the present disclosure further provides a pixel driving method for driving the pixel driving circuit according to any one of the foregoing. As shown in FIG. 3, the method includes but is not limited to the following steps and a combination of the following steps.

S1: controlling the driving transistor to be turned on to generate the driving current to drive the light emitting element to emit light.

Specifically, as shown in FIGS. 1-3, according to the foregoing, in the display phase, the gate signal Gate loaded on the gate line L2 is a high voltage, so that the switching transistor T3 may be controlled to be turned on, to transmit the data signal DATA loaded on the data line L1 to the gate of the driving transistor T1 and one terminal of the storage capacitor C electrically connected to the switching transistor T3 via the switching transistor T3. Then, the gate signal Gate on the gate line L2 becomes a low voltage, so that the switching transistor T3 is controlled to be turned off. Due to a storage function of the storage capacitor C, the voltage of the gate of the driving transistor T1 may continue to maintain a voltage value of the data signal Data transmitted via the switching transistor T3 at a previous moment, so that the driving transistor T1 is turned on, so as to generate the driving current I1 to drive the light emitting element D to emit light.

S2: determining a voltage at the third node based on a difference between an actual gray scale and an expected gray scale of the light emitting element to control the auxiliary transistor to be turned on to generate the auxiliary current.

Specifically, as shown in FIGS. 1-3, an example that the gate of the driving transistor T1 is electrically connected to the gate of the auxiliary transistor T2 is taken herein, the voltage of the gate of the auxiliary transistor T2 may also continue to maintain a voltage value of the data signal Data transmitted via the switching transistor T3 at the previous moment. That is, the driving transistor T1 and the auxiliary transistor T2 may be simultaneously turned on to generate the driving current I1 and the auxiliary current I2, so as to control a magnitude of the current I3 flowing into the light emitting element D to drive the light emitting element D to emit light.

In combination with the above discussion, a magnitude and a direction of the auxiliary current I2 are related to a voltage value of the third signal VSH, where, the third signal VSH is related to a difference between an actual gray scale and an expected gray scale of the light emitting element D. Specifically, before a picture display is performed, a voltage value of a corresponding third signal VSH may be determined according to the difference between an actual gray scale and a corresponding expected gray scale of each of the light emitting elements D having different light emitting colors, so as to form database of "voltage values of the third signal VSH". Further, while the picture display is performed, a voltage value of the third signal VSH corresponding to the difference between a corresponding actual gray scale and an expected gray scale of the light emitting element D may be selected according to the light emitting color of the light emitting element D and the expected gray scale and be loaded to the third node C, so as to form a corresponding auxiliary current I2 to compensate for the light emitting brightness of the light emitting element D. As a result, the actual gray scale of the light emitting element D is close to the expected gray scale, thereby improving the color shift phenomenon of the display picture.

The present disclosure a pixel driving circuit, a pixel driving method, and a display panel. The pixel driving circuit includes the light emitting element electrically connected between the first node and the second node; the driving transistor connected in series between the second node and the light emitting element, where the driving transistor is configured to generate the driving current; and an auxiliary transistor connected in series between the third node and the light emitting element, where the auxiliary transistor is configured to generate the auxiliary current to jointly drive the light emitting element with the driving current. In the present disclosure, the auxiliary transistor is newly added to generate the auxiliary current, so that a magnitude of a current flowing through the light emitting element is adjusted on a basis of the driving current, so as to compensate for light emitting brightness of the light emitting element. As a result, a brightness difference of the light emitting elements having different light emitting colors at the same gray scale is reduced, thereby improving the color shift phenomenon of the pixel consisted of a plurality of light emitting elements having different light emitting colors.

The pixel driving circuit, the pixel driving method, and the display panel provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A pixel driving circuit, comprising:

a light emitting element electrically connected between a first node and a second node;

a driving transistor connected in series between the second node and the light emitting element, wherein the driving transistor is configured to generate a driving current; and an auxiliary transistor connected in series between a third node and the light emitting element, where the auxiliary transistor is configured to generate an auxiliary current to jointly drive the light emitting element with the driving current;

wherein a gate of the driving transistor is electrically connected to a gate of the auxiliary transistor;

wherein the third node is loaded with an auxiliary voltage that is less than a voltage at a connection point between the auxiliary transistor and the light emitting element; and wherein the channel width of the driving transistor is in a range of 10 microns to 60 microns, and the channel width of the auxiliary transistor is less than or equal to 10 microns.

2. The pixel driving circuit of claim 1, further comprising:

a switching transistor, wherein a gate of the driving transistor and a gate of the auxiliary transistor are both connected to a source or a drain of the switching transistor.

3. The pixel driving circuit of claim 1, wherein an absolute value of a difference between a channel width of the auxiliary transistor and a channel width of the driving transistor is less than or equal to 10 microns.

4. The pixel driving circuit of claim 1, wherein the light emitting element is an organic light emitting diode or an inorganic light emitting diode.

5. The pixel driving circuit of claim 1, further comprising:

a storage capacitor electrically connected between a gate of the driving transistor and one terminal of the light emitting element electrically connected to the driving transistor; and a switching transistor connected in series between the gate of the driving transistor and a data line, wherein the gate of the switching transistor is electrically connected to a gate line.

6. A pixel driving circuit, comprising:

a light emitting element electrically connected between a first node and a second node;

a driving transistor connected in series between the second node and the light emitting element, wherein the driving transistor is configured to generate a driving current; and an auxiliary transistor connected in series between a third node and the light emitting element, wherein the auxiliary transistor is configured to generate an auxiliary current to jointly drive the light emitting element with the driving current;

wherein the third node is loaded with an auxiliary voltage that is less than a voltage at a connection point between the auxiliary transistor and the light emitting element; and wherein the channel width of the driving transistor is in a range of 10 microns to 60 microns, and the channel width of the auxiliary transistor is less than or equal to 10 microns.

7. The pixel driving circuit of claim 6, wherein a gate of the driving transistor is electrically connected to a gate of the auxiliary transistor.

8. The pixel driving circuit of claim 7, further comprising:

a switching transistor, wherein a gate of the driving transistor and a gate of the auxiliary transistor are both connected to a source or a drain of the switching transistor.

9. The pixel driving circuit of claim 6, wherein the light emitting element is an organic light emitting diode or an inorganic light emitting diode.

10. The pixel driving circuit of claim 6, further comprising:

a storage capacitor electrically connected between a gate of the driving transistor and one terminal of the light emitting element electrically connected to the driving transistor; and a switching transistor connected in series between the gate of the driving transistor and a data line, wherein the gate of the switching transistor is electrically connected to a gate line.

11. A pixel driving method for driving the pixel driving circuit of claim 8, comprising:

controlling the driving transistor to be turned on to generate the driving current to drive the light emitting element to emit light; and determining a voltage at the third node based on a difference between an actual gray scale and an expected gray scale of the light emitting element, to control the auxiliary transistor to be turned on to generate the auxiliary current;

wherein the third node is loaded with an auxiliary voltage that is less than a voltage at a connection point between the auxiliary transistor and the light emitting element.

12. The pixel driving method of claim 11, wherein a gate of the driving transistor is electrically connected to a gate of the auxiliary transistor.

* * * * *